United States Patent [19]

Diotte

[11] Patent Number: 5,324,174

[45] Date of Patent: Jun. 28, 1994

[54] COMBINED SHOCK ABSORBING SEAT POST AND AIR PUMP ASSEMBLY

[75] Inventor: Henri Diotte, Ile Bizard, Canada

[73] Assignee: Societe De Developpement De L'ile Bizard Inc., Ile Bizard, Canada

[21] Appl. No.: 58,399

[22] Filed: May 7, 1993

[51] Int. Cl.⁵ .......................... F04B 21/08; B62B 3/04
[52] U.S. Cl. ...................... 417/234; 417/313; 417/545; 248/601; 280/201
[58] Field of Search .............. 417/234, 236, 313, 545, 417/550, 551, 552, 553, 554; 248/623, 599, 600, 601; 280/201, 288.4, 283

[56] References Cited

U.S. PATENT DOCUMENTS

| | | |
|---|---|---|
| 799,786 | 9/1905 | Freel ..................... 280/201 |
| 2,562,679 | 7/1951 | Ort . |
| 3,229,954 | 1/1966 | Hendricks . |
| 3,561,783 | 2/1971 | Ellett . |
| 3,856,252 | 12/1974 | Regis . |
| 3,891,236 | 6/1975 | Kuwano et al. . |
| 3,936,076 | 2/1976 | Probst . |
| 3,989,263 | 11/1976 | Stuck et al. . |
| 4,182,508 | 1/1980 | Kallai et al. . |
| 4,712,592 | 12/1987 | Brown ..................... 141/98 |
| 4,736,983 | 4/1988 | Furbee ..................... 297/209 |
| 4,842,290 | 6/1989 | Alioto . |
| 4,997,232 | 3/1991 | Johnsen ..................... 248/601 |
| 5,016,894 | 5/1991 | Alioto ..................... 280/201 |
| 5,035,440 | 7/1991 | Chappel . |
| 5,044,648 | 9/1991 | Knapp . |
| 5,062,617 | 11/1991 | Campbell ..................... 267/132 |
| 5,094,424 | 3/1992 | Hartway . |
| 5,127,804 | 7/1992 | Chappell ..................... 417/231 |
| 5,137,430 | 8/1992 | Alioto ..................... 417/231 |

FOREIGN PATENT DOCUMENTS

| | | | |
|---|---|---|---|
| 194714 | 4/1957 | Australia ..................... 417/313 |
| 635611 | 9/1936 | Fed. Rep. of Germany ...... 280/283 |
| 983310 | 6/1951 | France ..................... 417/313 |
| 2211800 | 7/1989 | United Kingdom ............... 280/201 |

Primary Examiner—Henry A. Bennet
Assistant Examiner—Roland G. McAndrews, Jr.
Attorney, Agent, or Firm—Merchant & Gould, Smith, Edell, Welter & Schmidt

[57] ABSTRACT

The combined shock absorbing seat post and air pump assembly is for use on a bicycle or the like. The assembly comprises two hollow tubes inserted one into the other defining a compression chamber from which the compressed air may be sent to an inflatable device such as a tire. A shock absorbing mechanism is further provided for attenuating jarring conditions while operating the bicycle on a rough surface. The shock absorbing mechanism comprises an helicoidal compression spring in which the tension can be adjusted by hand upon rotation of a screwed element. The assembly provides a very practical and very compact assembly that combines the advantages of an air pump in the seat post and the advantages of an easily adjustable shock absorber mounted on the seat post.

9 Claims, 5 Drawing Sheets

COMBINED SHOCK ABSORBING SEAT POST AND AIR PUMP ASSEMBLY

FIELD OF THE INVENTION

The present invention relates to a combined shock absorbing seat post and air pump assembly for use on a bicycle or the like.

BACKGROUND OF THE INVENTION

As there is a constant need for more practical and more compact bicycles, there is also a greater need for comfort. There is therefore a constant demand for devices that improve the practicality and the comfort of the bicycles.

One practical device on a bicycle is the air pump used for inflating a flat tire. It has already been disclosed that the air pump be located within the seat post for reducing the space taken on the frame itself and avoiding the pump to be lost or stolen.

On the other hand, comfort is also an important factor which many users are seeking. For that purpose, shock absorbers are often found on the frame of a bicycle.

Since most of the weight of a bicycle user is on the seat, seat posts shock absorbers and cushioning arrangements are very suitable for attenuating jarring conditions while operating the bicycle on rough surfaces. However, the shock absorbers known in the art cannot be easily adjusted according to the weight of the user and the conditions of the road or track.

SUMMARY OF THE INVENTION

The object of the present invention is to provide a very practical and very compact assembly that combines the advantages of an air pump in the seat post and the advantages of an easily adjustable shock absorber mounted on the seat post.

More particularly, the object of the present invention is to provide a combined shock absorbing seat post and air pump assembly for use on a bicycle or the like, the assembly comprising:

- a first hollow tube having a bottom end closed by an end wall and having an upper open end, the first tube being insertable in a seat post sleeve of a bicycle frame;
- a second hollow tube in sliding relationship with the first tube through the upper open end thereof and snugly fitted therein, the second tube being closed by a wall separating a compression chamber from ambient air, the compression chamber being defined by at least the end wall of the first tube and the wall of the second tube;
- air connecting means connected to an air outlet hole made through the end wall of the first tube and having a free end attachable to an air valve of an inflatable device for providing compressed air thereto when reducing the volume of the compression chamber upon reciprocal movement of the first and second tubes;
- a first check valve, located in the air connecting means, for preventing air from entering the compression chamber through the air outlet hole;
- a second check valve set in said air connecting means for preventing air in the inflatable device from escaping through said air connecting means; and
- shock absorbing means for attenuating jarring conditions while operating the bicycle on a rough surface, the shock absorbing means comprising:
  - an helicoidal spring mounted around the second tube for forcing opposite movement of the first and second tubes, the spring having a lower end resting on a shoulder of the first tube and an upper end secured to the second tube;
  - an internally threaded element in mesh with an externally threaded segment of the second tube for securing the upper end of the spring to the second tube, the threaded element being rotatable by hand along the segment for modifying the tension of the spring; and
  - resilient sealing means mounted around the spring for substantially hermetically sealing the spring.

According to a preferred embodiment, the shock absorbing means further comprise guiding means for avoiding relative angular movements between the first and second tubes. Preferably, the guiding means comprise:

- two coaxial radial holes made through the first tube and opposed to each other;
- two longitudinal slots facing each other in the second tube, each of the slots being adjacent to one of the radial holes; and
- a pin inserted into the radial holes and longitudinal slots for guiding the first and second tubes;
- whereby relative angular movements of the first and second tubes are prevented and reciprocating longitudinal movements of the first and second tubes are allowed within limits imposed by the length of the longitudinal slots.

According to another preferred embodiment, the wall separating the compression chamber from ambient air is located at the lower end of the second tube.

According to a still preferred embodiment, the assembly further comprises a sealing ring attached to the upper open end of the first tube and snugly fitted around the second tube for preventing air from escaping the compression chamber through the interstice between the first tube and the second tube.

According to a still preferred embodiment, the resilient sealing means mounted around the spring comprise a cylindrical resilient cover bonded to two resilient washers mounted around the second tube and on which respective ends of the spring abut.

According to a still preferred embodiment, the assembly further comprises a rigid washer mounted around the second tube between the threaded element and the resilient washer adjacent to the upper end of the spring.

According to a still preferred embodiment, the air connecting means comprise an elongated flexible hose.

It is also an object of the present invention to provide a combined shock absorbing seat post and air pump assembly for use on a bicycle or the like, the assembly comprising:

- a first hollow tube having a bottom end closed by a first end wall and having an upper open end, the first tube being insertable in a seat post sleeve of a bicycle frame;
- a second hollow tube in sliding relationship with the first tube through the upper open end thereof and snugly fitted therein, the second tube being closed by a second end wall separating a compression chamber from ambient air, the compression chamber being defined by at least the first and the second end walls;

an elongated flexible hose connected to an air outlet hole made through the first end wall and having a free end attachable to an air valve of an inflatable device for providing compressed air thereto when reducing the volume of the compression chamber upon reciprocal movement of the first and second tubes;

a first check valve, located at the free end of the hose, for preventing air from entering the compression chamber through the air outlet hole;

a second check valve set in the free end of the hose for preventing air in the inflatable device from escaping through the hose;

a sealing ring attached to the upper open end of the first tube and snugly fitted around said second tube for preventing air from escaping the compression chamber through the interstice between the first tube and the second tube; and shock absorbing means for attenuating jarring conditions while operating the bicycle on a rough surface, the shock absorbing means comprising:

an helicoidal spring mounted around the second tube for forcing opposite movement of the first and second tubes, the spring having a bottom end resting on a shoulder of the first tube and an upper end secured to the second tube;

an internally threaded element in mesh with an externally threaded segment of the second tube for securing the upper end of the spring to the second tube, the threaded element being rotatable by hand along the segment for modifying the tension of the spring;

guiding means for avoiding relative angular movements between the first and second tubes, the guiding means comprising two coaxial radial holes made through the first tube and opposed to each other; two longitudinal slots facing each other in the second tube, each of the slots being adjacent to one of the radial holes; and a cutter pin inserted into the radial holes and longitudinal slots for guiding the first and second tubes, whereby relative angular movements of the first and second tubes are prevented and reciprocating longitudinal movements of the first and second tubes are allowed within limits imposed by the length of the longitudinal slots; and resilient sealing means mounted around the spring for substantially hermetically sealing the spring, the sealing means comprising a cylindrical resilient cover bonded to two resilient washers mounted around the second tube and on which respective ends of the spring abut, and a rigid washer mounted around the second tube between the threaded element and the resilient washer adjacent to the upper end of the spring.

A non restrictive description of a preferred embodiment will now be given with reference to the appended drawings.

IDENTIFICATION OF THE COMPONENTS

Figure 1:
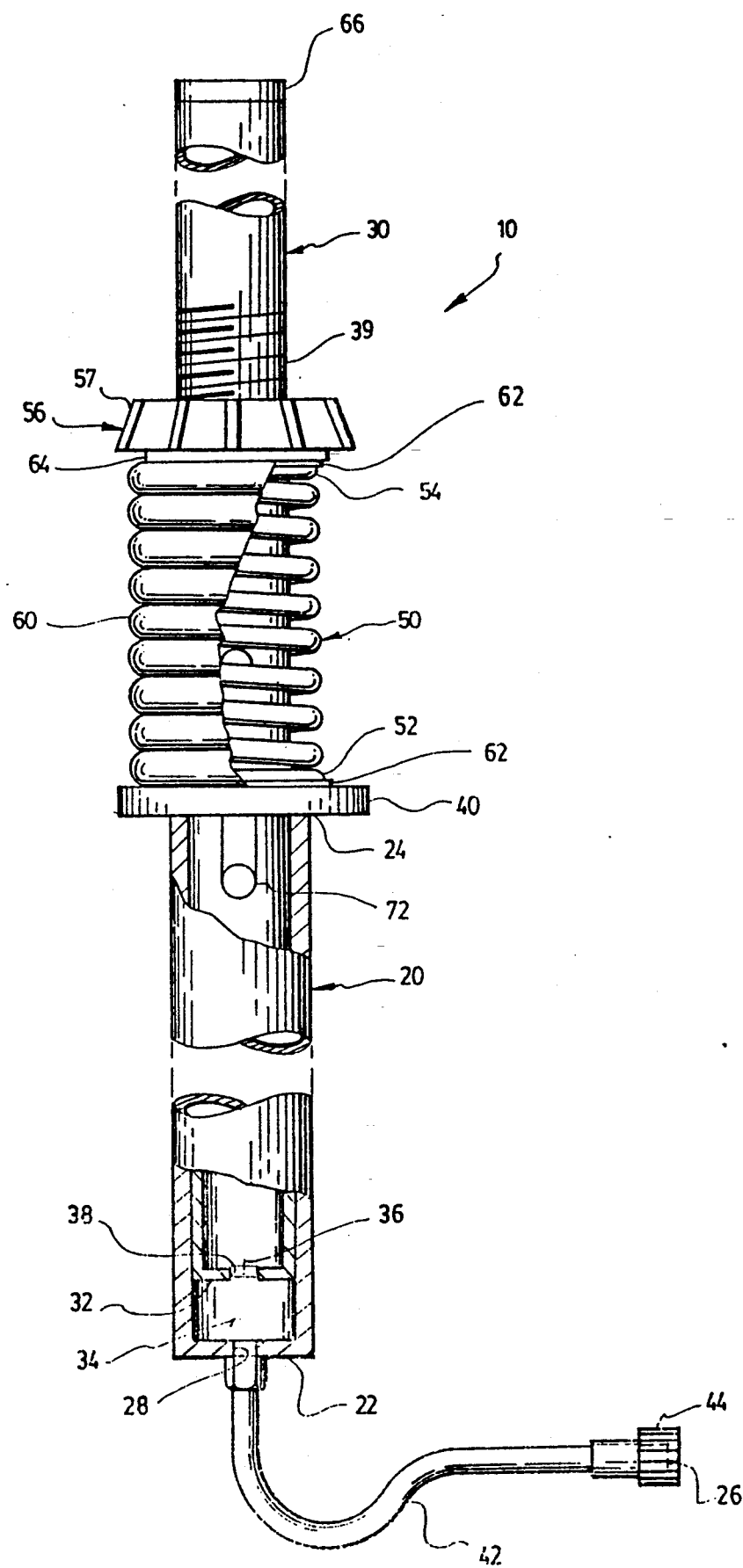
FIG. 1 is a partial longitudinal section view of an assembly according to the invention.

The following is a list of the components found in the drawings and in the description of a preferred embodiment.

10 combined shock absorbing seat and air pump assembly
12 seat post sleeve
14 bicycle frame
16 holding key
18 seat
19 tire
20 first hollow tube
22 end wall (first)
24 upper open end
26 first check valve
28 air outlet hole
29 shoulder
30 second hollow tube
32 end wall (second)
34 compression chamber
36 second check valve
38 air inlet hole
39 externally threaded segment
40 sealing ring
42 elongated flexible hose
44 air connector
50 helicoidal spring
52 lower end of helicoidal spring
54 upper end of helicoidal spring
56 internally threaded element
57 holding knob
60 cylindrical resilient cover
62 resilient washers
64 rigid washer
66 cap
70 radial hole in first tube
72 longitudinal slot in second tube
74 cutter pin
76 washer
78 cap
80 screw
82 groove

DESCRIPTION OF A PREFERRED EMBODIMENT

Referring to the drawings, the combined shock absorbing seat post and air pump assembly 10 comprises a first hollow tube 20 having a bottom end closed by an end wall 22. The upper portion of the first tube 20 has an upper open end 24.

A second hollow tube 30 is inserted in the first tube 20 through the upper open end 24 and in sliding relationship therewith. The second tube 30 is snugly fitted in the first tube 20 so that lateral movements of the second tube 30 in the first tube 20 are very limited but without interfering greatly on the sliding movements.

The second tube 30 is closed by a wall, preferably an end wall 32 at the lower end thereof, separating a compression chamber 34 from ambient air. The compression chamber 34 is defined by at least the end wall 22 and the end wall 32. It is not essential that the wall be an end wall. Other locations inside the second tube 30 are also suitable.

Figure 2:
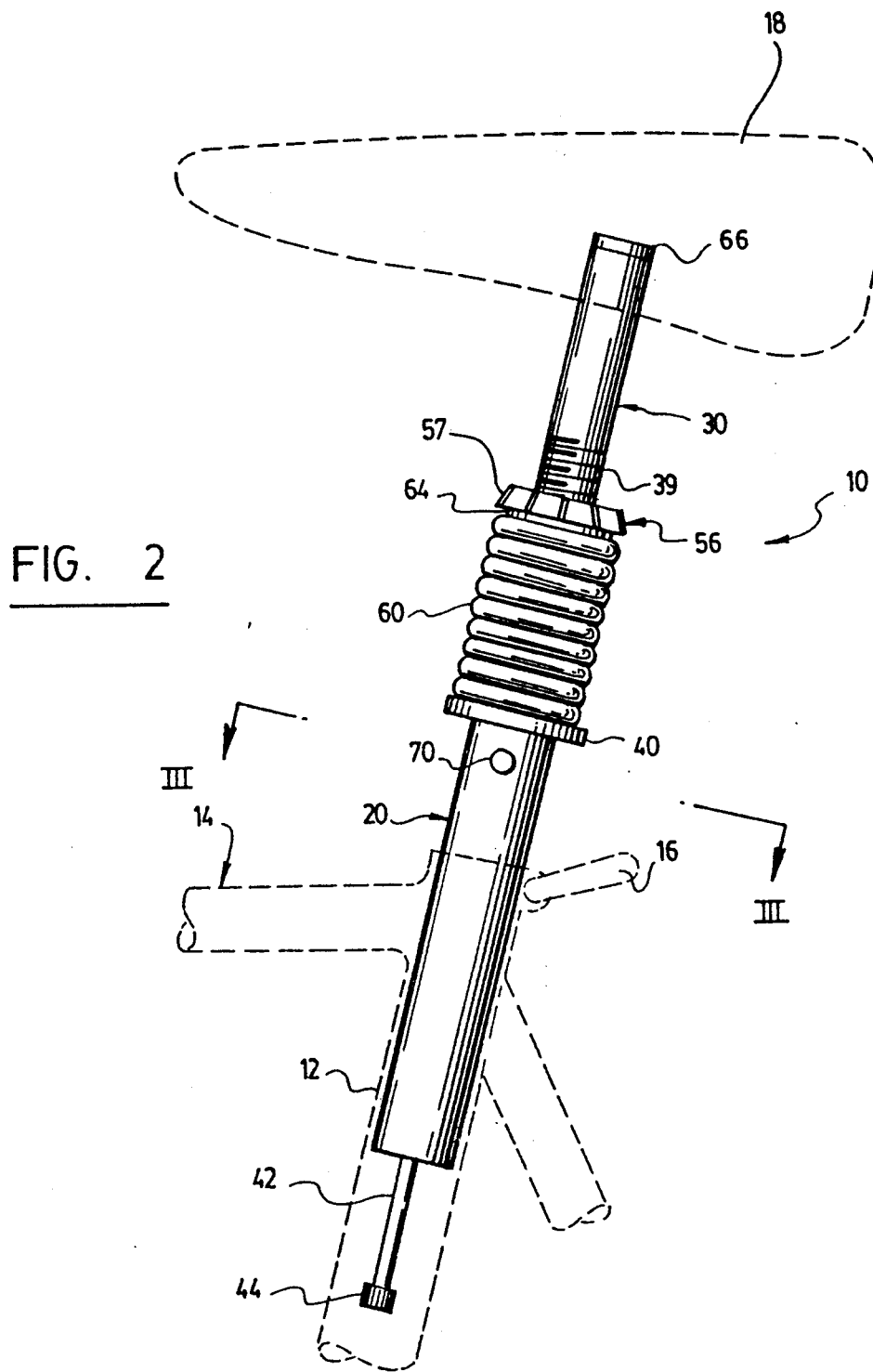
FIG. 2 is a side view of the assembly of FIG. 1, inserted in a bicycle frame.

The first tube 20 is insertable in a seat post sleeve 12 of a bicycle frame 14 as shown in FIG. 2. A holding key 16 is usually used for holding the assembly 10 at the desired height. A seat 18 is intended to be mounted at the upper free end of the second tube 30 by conventional attaching means (not shown). Alternatively, the seat 18 can be mounted on an inverted assembly 10, where the upper free end is the lower end of the first tube 20 shown in the drawings. In that latter embodiment, the second tube 30 is inserted in the seat post sleeve 12.

Air connecting means are provided for connecting an air outlet hole 28, made through the end wall 22 and an air valve of an inflatable device. The inflatable device is, for example, a pneumatic bicycle tire 19, shown in FIG. 7. The air connecting means preferably comprise an elongated flexible hose 42 permanently connected to the air outlet hole 28. The free end of the hose 42 is provided with a conventional air connector 44 screwable onto the air valve of the inflatable device. The air connecting means provide compressed air to the inflatable device when reducing the volume of the compression chamber 34 upon reciprocal movement of the first tube 20 and second tube 30. Of course, a short rigid air connecting hose may be used for achieving the same purpose.

A first check valve 26 is set in an air connector 44 for preventing air in the tire 19 from escaping through the hose 42. The first check valve 26 may also be located in the air inlet hole 38. A second check valve 36 is set in the air inlet hole 38 for preventing air in the compression chamber 34 from escaping through the air inlet hole 38.

The check valves 26 and 36 are conventional items.

Preferably, the assembly 10 further comprises a sealing ring 40 around the upper open end 24 for preventing air from escaping the compression chamber 34 through the interstice between the first tube 20 and the second tube 30. The sealing ring 40 is attached to a shoulder 29 of the first tube 20 and is made of plastic, rubber and similar materials. The sealing ring 40 is snugly fitted around the second tube 30 but allows it to slide without much difficulty. Of course, another arrangement may be used for achieving the same purpose.

The air losses in the interstice between the first tube 20 and the second tube 30 may be considered negligible if the tubes are well machined.

The assembly 10 further comprises shock absorbing means for attenuating jarring conditions while operating the bicycle on a rough surface, such as a bumpy road or track. The shock absorbing means comprise an helicoidal compression spring 50 mounted around the second tube 30 for forcing opposite movement of the first tube 20 and second tube 30. The spring 50 has a lower end 52 resting on a shoulder 29 of the first tube 20, and an upper end 54 secured to the second tube 30.

Figure 5:
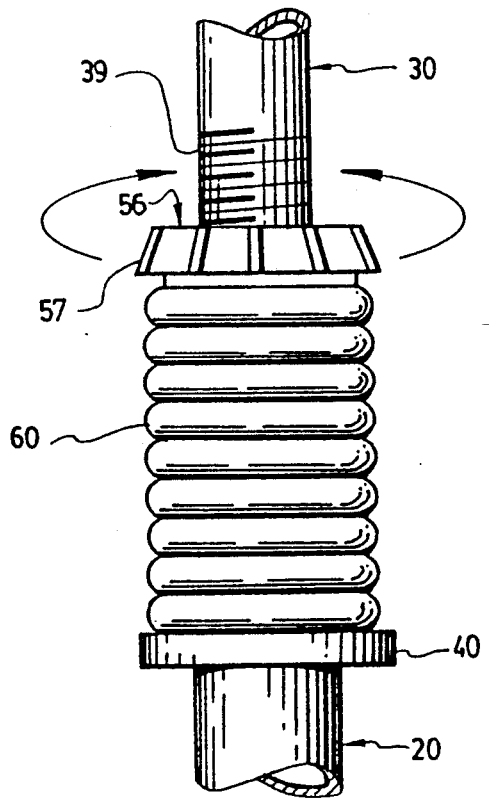
FIG. 5 is a partial side elevational view of the assembly of FIG. 1, showing a way the tension of the spring can be adjusted.

An internally threaded element 56 in mesh with an externally threaded segment 39 of said second tube 30 is provided for securing the upper end 54 of the spring to the second tube 30. The threaded element 56 is rotatable by hand along the segment 39 for modifying the tension of the spring 50. It has preferably a frusto-conical shape which is very suitable for its hand operation. Preferably, holding knobs 57 located on the threaded element 56 help to get a hand grip for easily turning it by hand as shown in FIG. 5. Of course, one can use a tool for helping turning the threaded element 56.

Figure 6:
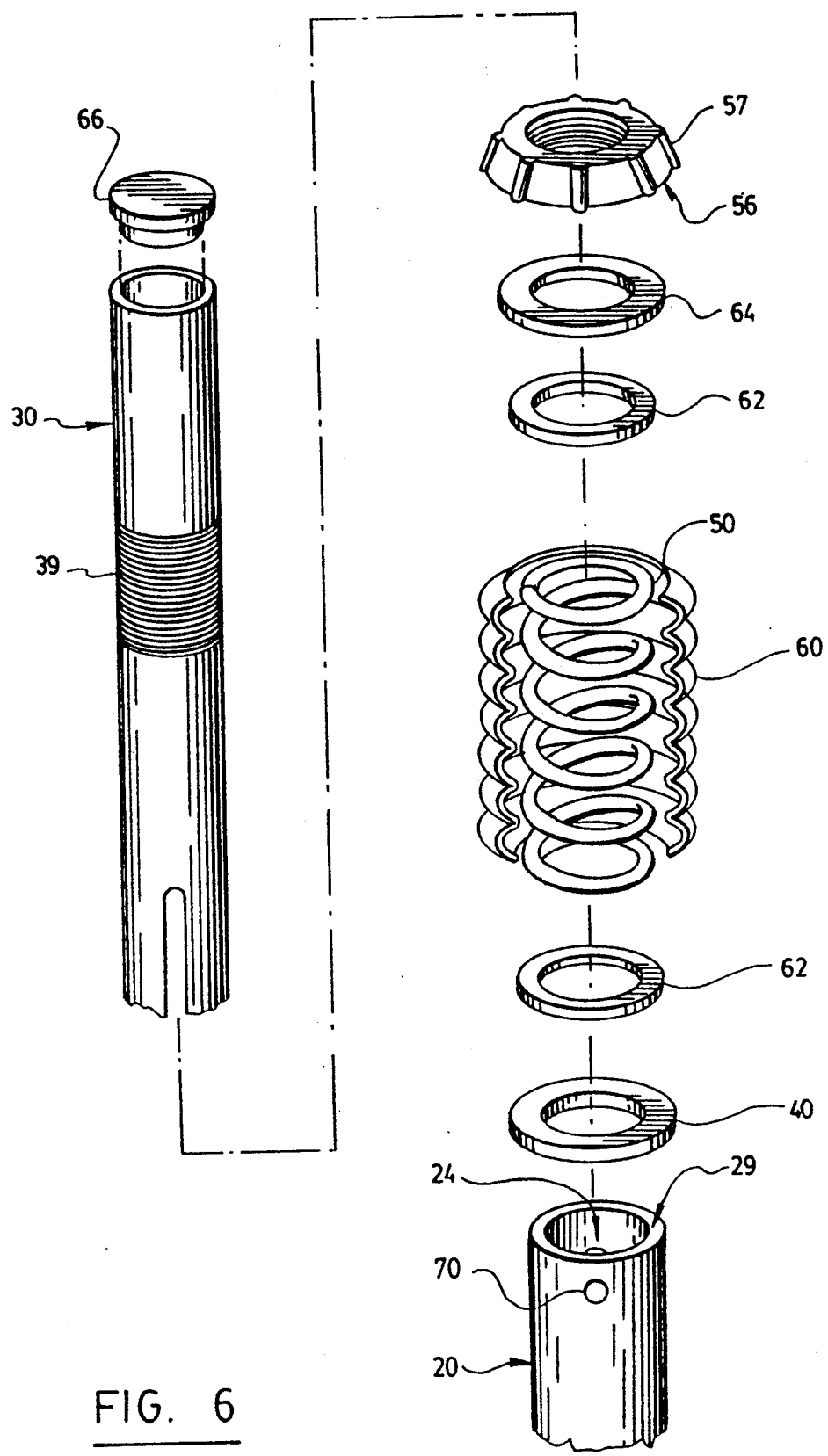
FIG. 6 is a partial exploded view of the upper portion of the assembly of FIG. 1.

As best shown in FIG. 6, resilient sealing means are mounted around said spring 50 for substantially hermetically sealing it so that water or dust cannot go between the first tube 20 and the second tube 30. The resilient sealing means preferably comprise a cylindrical resilient cover 60 bonded to two resilient washers 62 snugly fitted around the second tube 20 and on which respective ends of said spring 50 abut. The pressure exerted by the spring 50 helps the washers 62 to be well against adjacent elements for avoiding water or dust inside along the second tube 30. Additionally, a cap 66 is inserted at the upper end of the second tube 30. This avoids water or dust to get inside by that way. The water or dust may be thrown under the seat 19 by the rotation of the rear wheel of a bicycle (not shown).

In order to prevent the washer 62 adjacent to the upper end 54 from wearing off when the threaded element 56 is rotated, there may be provided a rigid washer 64 mounted around the second tube 30 between the threaded element 56 and the above-mentioned washer 62, as shown in FIG. 6. The rigid washer 64 may be made of plastic or metal. The washer 64 is rigid because it allows integrity thereof in spite of the shearing due to the rotation of the threaded element 56 and the immobility of the adjacent washer 62.

The shock absorbing means may also comprise guiding means for avoiding relative angular movements between the first tube 20 and second tube 30.

Figure 3:
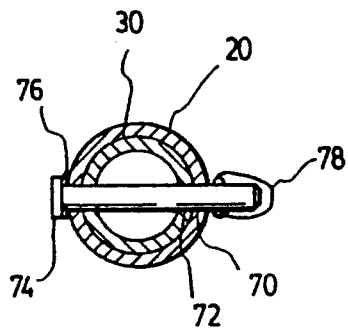
FIG. 3 is a cross-sectional view of the assembly according to the line III—III in FIG. 2.

The guiding means may comprise two coaxial radial holes 70 made through the first tube 20 and opposed to each other. Two longitudinal slots 72 facing each other are made through the second tube 30, each one being adjacent to one of the radial holes 70. As shown in FIG. 3, a pin 74, preferably a cutter pin, is inserted into the radial holes 70 and longitudinal slots 72 for guiding the first tube 20 and second tube 30 so that relative angular movements thereof are prevented and reciprocating longitudinal movements are allowed within limits imposed by the length of the longitudinal slots 72. The cutter pin 74 is preferably a self-locking cutter pin which can be easily inserted or removed by hand. Preferably, a washer 76 is inserted between the head of the cutter pin 74 and the first tube 20 to avoid water or dust to go inside the assembly 10. A plastic cap 78 is also used at the free end of the cutter pin 74 for the same reason.

Figure 4:
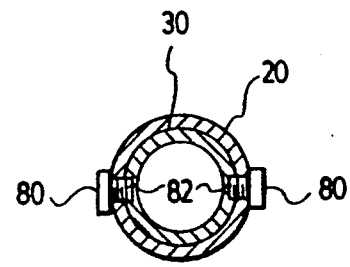
FIG. 4 is an alternative embodiment of FIG. 3.

Alternatively, as shown in FIG. 4, small screws 80 may be screwed inside the radial holes 70 and the longitudinal slots 72 may be replaced by longitudinal grooves 82 made in the surface of the second tube 30. This is suitable when the "end" wall 32 is rather in the upper portion of the second tube 30. In that case, the compression chamber 34 extends all inside the second tube 30. Of course, other kinds of guiding means may be used.

The use of guiding means is not imperative in all the cases because some designs may be self-guided, such as when the tubes 20 and 30 have a square rectangular cross-section.

Figure 7:
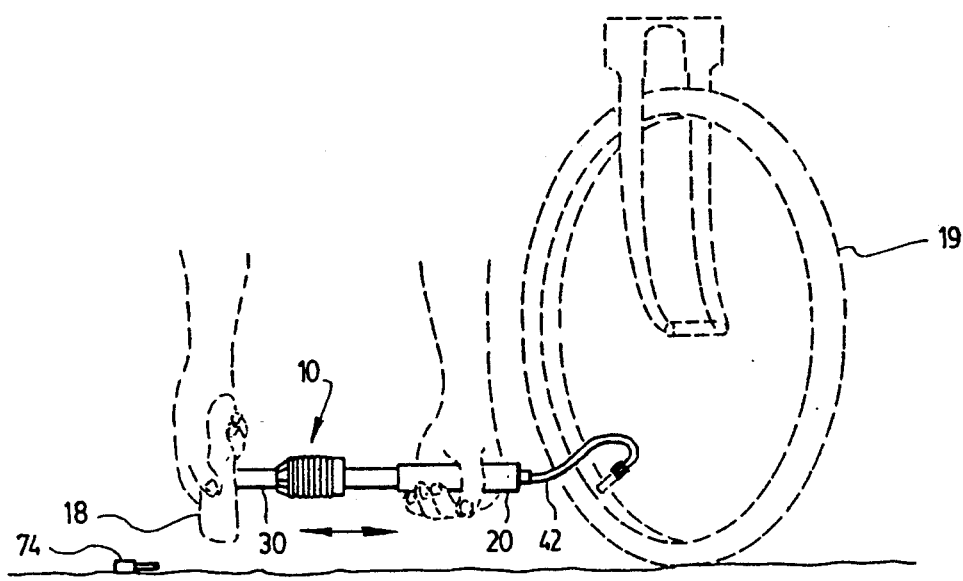
FIG. 7 is a perspective view of the assembly in use inflating a tire.

In use, as aforesaid, a seat 18 is attached at the upper end of the assembly 10, preferably to the second tube 30 but possibly to the first tube 20. The assembly 10 is inserted in a seat post sleeve 12 of a bicycle frame 14 so as to be used as a seat post with a shock absorber. If the pressure in the tire 19 is too low, or if a repair has been carried out, the user removes the assembly 10 from the seat post sleeve 12 and connects the air connector 44 to the air valve of the tire 19. As shown in FIG. 7, the user may then move the tubes 20 and 30 in an reciprocating movement as with a conventional air pump. If a guiding means is used, some parts may be removed to allow a wider movement, thereby a quicker inflation. In FIG. 7, the cutter pin 74 has been removed.

The air which goes to the compression chamber 34 may enter through the longitudinal slots 72 or by a vent provided thereon.

It has been said hereinabove that the assembly 10 can be inverted to have the seat 19 mounted to the first tube 20. In that case, one can easily understand that this does not substantially change the invention nor restricts the claims referring to the up and down directions.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

I claim:

1. A combined shock absorbing seat post and air pump assembly for use on a bicycle or the like, said assembly comprising:
   a first hollow tube having a bottom end closed by an end wall having an air outlet hole, said first tube being insertable in a seat post sleeve of a bicycle frame and having an upper open end;
   a second hollow tube in sliding relationship with said first tube through the upper open end thereof and fitted therein, said second tube being closed by a wall separating a compression chamber from ambient air and having an air inlet hole, the compression chamber being defined by at least the end wall of said first tube and the wall of said second tube;
   air connecting means connected to the air outlet hole made through said end wall of said first tube and having a free end attachable to an air valve of an inflatable device for providing compressed air thereto when reducing the volume of the compression chamber upon reciprocal movement of said first and second tubes;
   a first check valve, located in said air connecting means, for preventing air in the inflatable device from escaping through said air connecting means;
   a second check valve set in the air inlet hole for preventing air in the compression chamber from escaping through the air inlet hole; and
   shock absorbing means for attenuating jarring conditions while operating the bicycle on a rough surface, said shock absorbing means comprising:
      a helicoidal spring mounted around said second tube for forcing opposite movement of said first and second tubes, said spring having a lower end resting on a shoulder of said first tube and an upper end secured to said second tube;
      an internally threaded element in mesh with an externally threaded segment of said second tube for securing said upper end of said spring to said second tube, said threaded element being rotatable by hand along said segment for modifying the tension of said spring; and
      resilient sealing means mounted around said spring for substantially hermetically sealing said spring from ambient air.

2. An assembly according to claim 1, wherein said wall separating said compression chamber from ambient air is located at the lower end of said second tube.

3. An assembly according to claim 1, further comprising a sealing ring attached to said upper open end of said first tube and snugly fitted around said second tube for preventing air from escaping the compression chamber through the interstice between said first tube and said second tube.

4. An assembly according to claim 1, wherein said air connecting means comprise an elongated flexible hose.

5. An assembly according to claim 1, wherein said shock absorbing means further comprise guiding means for preventing relative angular movements between the first and second tubes.

6. An assembly according to claim 5, wherein said guiding means comprise:
   two coaxial radial holes made through said first tube and opposed to each other;
   two longitudinal slots facing each other in said second tube, each of said slots being adjacent to one of said radial holes; and
   a pin inserted into said radial holes and longitudinal slots for guiding said first and second tubes;
   whereby relative angular movements of said first and second tubes are prevented and reciprocating longitudinal movements of said first and second tubes are allowed within limits imposed by the length of said longitudinal slots.

7. An assembly according to claim 1, wherein said resilient sealing means mounted around said spring comprise a cylindrical resilient cover bonded to two resilient washers mounted around said second tube and on which respective ends of said spring abut.

8. An assembly according to claim 7, further comprising a rigid washer mounted around said second tube between said threaded element and said resilient washer adjacent to said upper end of said spring.

9. A combined shock absorbing seat post and air pump assembly for use on a bicycle or the like, said assembly comprising:
   a first hollow tube having a bottom end closed by a first end wall having an air outlet hole, said first tube being insertable in a seat post sleeve of a bicycle frame and having an upper open end and having an upper open end;
   a second hollow tube in sliding relationship with said first tube through the upper open end thereof and snugly fitted therein, said second tube being closed by a second end wall separating a compression chamber from ambient air and having an air inlet hole, the compression chamber being defined between said first and said second end walls;
   an elongated flexible hose connected to the air outlet hole made through said first end wall and having a free end attachable to an air valve of an inflatable device for providing compressed air thereto when reducing the volume of the compression chamber upon reciprocal movement of said first and second tubes;
   a first check valve, located at the free end of said hose, for preventing air in the inflatable device from escaping through said hose;
   a second check valve set in the air inlet hole for preventing air in the compression chamber from escaping through the air inlet hole;
   a sealing ring attached to said upper open end of said first tube and snugly fitted around said second tube for preventing air from escaping the compression chamber through the interstice between said first tube and said second tube; and shock absorbing means for attenuating jarring conditions while operating the bicycle on a rough surface, said shock absorbing means comprising:

a helicoidal spring mounted around said second tube for forcing opposite movement of said first and second tubes, said spring having a bottom end resting on a shoulder of said first tube and an upper end secured to said second tube;

an internally threaded element in mesh with an externally threaded segment of said second tube for securing said upper end of said spring to said second tube, said threaded element being rotatable by hand along said segment for modifying the tension of said spring;

guiding means for preventing relative angular movements between the first and second tube, said guiding means comprising: two coaxial radial holes made through said first tube and opposed to each other; two longitudinal slots facing each other in said second tube, each of said slots being adjacent to one of said radial holes; and a cutter pin inserted into said radial holes and longitudinal slots for guiding said first and second tubes, whereby relative angular movements of said first and second tubes are prevented and reciprocating longitudinal movements of said first and second tubes are allowed within limits imposed by the length of said longitudinal slots; and resilient sealing means mounted around said spring for substantially hermetically sealing said spring from ambient air, said sealing means comprising a cylindrical resilient cover bonded to two resilient washer mounted around said second tube and on which respective ends of said spring abut, and a rigid washer mounted around said second tube between said threaded element and said resilient washer adjacent to said upper end of said spring.

* * * * *